United States Patent [19]

Burg

[11] Patent Number: 4,685,305

[45] Date of Patent: Aug. 11, 1987

[54] HYPOBARIC STORAGE OF RESPIRING PLANT MATTER WITHOUT SUPPLEMENTARY HUMIDIFICATION

[76] Inventor: Stanley P. Burg, 3770 Kent Ct., Miami, Fla. 33133

[21] Appl. No.: 780,636

[22] Filed: Sep. 26, 1985

[51] Int. Cl.⁴ ............................................. F24F 3/16
[52] U.S. Cl. ........................................ 62/78; 62/97; 62/100; 62/268; 165/30; 426/418
[58] Field of Search ............... 62/78, 100, 268, 97; 426/418, 419; 165/30; 34/15

[56] References Cited

U.S. PATENT DOCUMENTS

| | | | |
|---|---|---|---|
| 1,902,575 | 3/1933 | Nichols | 62/100 |
| 2,671,643 | 3/1954 | Gordon, Jr. | 165/30 |
| 2,855,839 | 10/1958 | Teigen | 62/97 |
| 3,119,239 | 1/1964 | Sylvan | 62/97 |
| 3,233,334 | 2/1966 | Hamilton | 34/15 |

Primary Examiner—Ronald C. Capossela
Attorney, Agent, or Firm—Robert M. Schwartz; Edward I. Mates

[57] ABSTRACT

The hypobaric preservation of respiring plant matter without the step of humidifying the storage atmosphere by contacting it with a supplementary body of heated water is hereby disclosed, characterized by storage at controlled and correlated conditions of temperature, subatmospheric pressure, evacuation rate, air recirculation rate and air intake rate, and by the dependence of each set of correlated conditions upon the weight, respiration rate and type of plant matter. Expanded relatively dry atmospheric air is passed into and humid rarified air is withdrawn from the storage chamber at rates which maintain an optimal steady-state oxygen partial pressure for each type of respiring, oxygen-consuming plant matter, and a nearly saturated relative humidity sufficient to keep the temperature of the respiring, heat producing plant matter equal to or slightly higher than the temperature of the chamber walls and rarified air. The evacuation rate is adjusted to exhaust less saturated steam from the cargo chamber than the amount released from the plant matter responsive to its respiratory heat, and the recirculation rate is controlled to mix at least 25 volumes of cool, saturated chamber air with each incoming volume of expanded dry atmospheric air before the incoming dry air is permitted to contact the stored plant matter. The preferred recirculation means, a jet-type Venturi air mover powered by the incoming atmospheric air, automatically adjusts the recirculation rate to a proper volumetric displacement responsive and correlated to the amount of expanded dry atmospheric air which enters the storage chamber.

20 Claims, 1 Drawing Figure

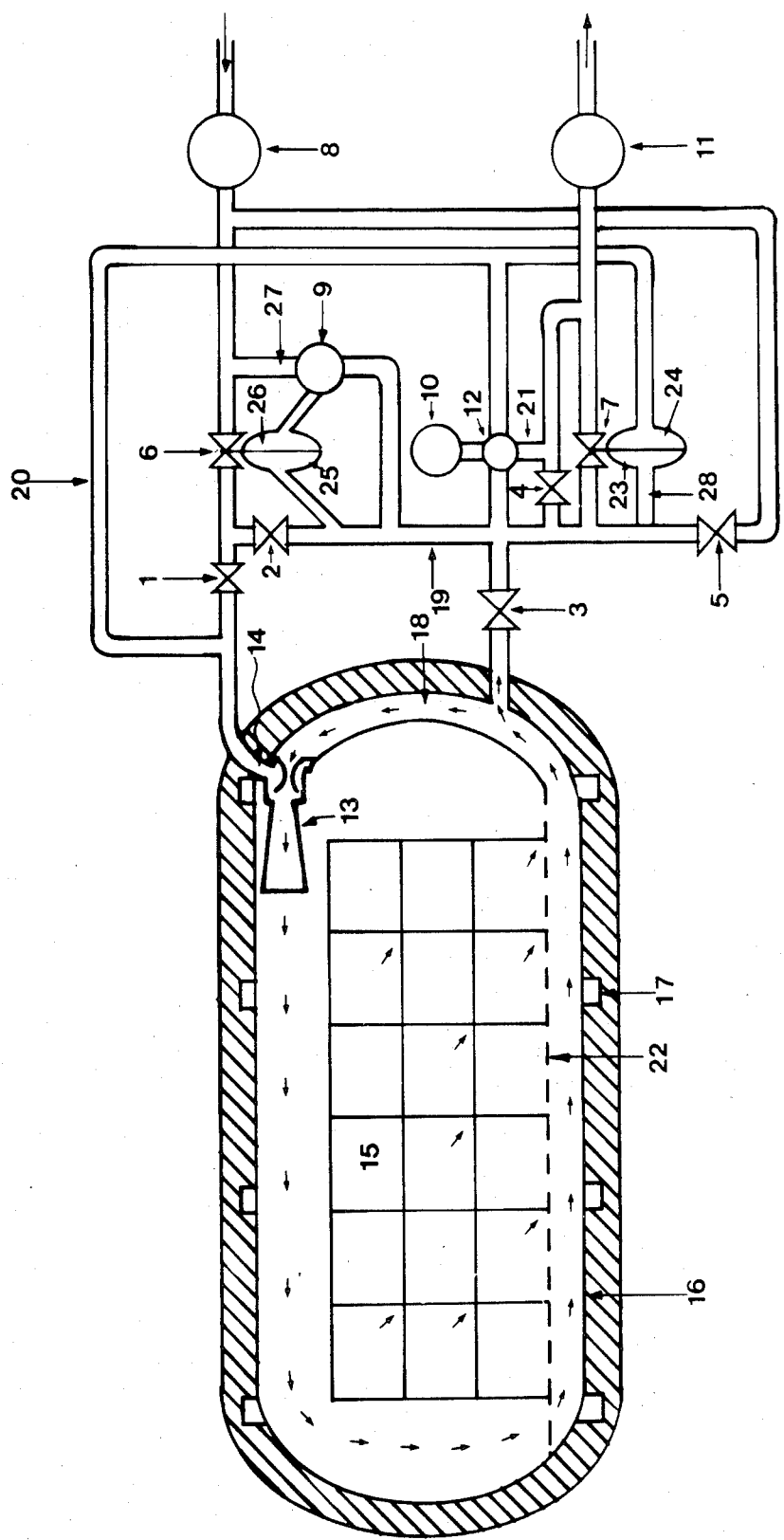

HYPOBARIC STORAGE OF RESPIRING PLANT MATTER WITHOUT SUPPLEMENTARY HUMIDIFICATION

BACKGROUND OF THE INVENTION

In my prior U.S. Pat. No. 3,333,967, now reissue U.S. Pat. No. Re. 28,995, a method is disclosed for preserving mature but less than fully ripe fruit which produce ethylene and are ripened thereby, using hypobaric conditions of about 100 to 400 mm HgA pressure in a flowing stream of humidified, nearly water-saturated air. This method gave useful results on a laboratory scale and under favorable conditions on a somewhat larger scale, but not when the size was increased and the pressure reduced below 100 mm HgA to improve the storage performance with certain mature but less than fully ripe fruit and to extend the utility of the method to other types of metabolically active matter, including animal matter. The evaporative cooling effect when air is contacted with a body of water which is relatively smaller in relation to the whole storage space than was the body of water in relation to the size of a conventional laboratory vacuum vessel decreases the temperature of the humidifying water. In my prior U.S. Pat. Nos. 3,810,508 and 3,913,661 with W. Hentschel, I disclose how to use and profit by this cooling to lessen the work of, or eliminate other ways and means of cooling the chamber, but refrigerating by evaporating water runs counter to the objective of creating and maintaining high humidity. As the water cools, its vapor pressure is lowered and it tends to add progressively less moisture to the incoming air so that the relative humidity in the chamber is reduced and the product dries and spoils prematurely.

In my prior U.S. Pat. Nos. 3,958,028 and 4,061,483 I disclose how to overcome the evaporative cooling effect and provide a constant high relative humidity in the storage chamber. Incoming expanded atmospheric air is preconditioned to the pressure and temperature inside the vacuum chamber, and then it is contacted with a body of heated water to saturate the chamber atmosphere. I also disclose that a relatively broad spectrum of correlated hypobaric pressures and low temperatures at a high relative humidity is operational in preserving metabolically active matter at pressures ranging form 4 to 400 mm HgA.

The humidification step of U.S. Pat. Nos. 3,958,028 and 4,061,483 has prevented the development of economically useful commercial hypobaric intermodal transportation containers which embody the equipment and method of these older patents. It is impractical to displace valuable cargo with the weight and volume of water which is needed to continuously saturate the incoming dry expanded atmospheric air changes during a prolonged oceanic trip, so instead a smaller amount of stored water has to be recycled by reclaiming the moisture which condenses when the saturated chamber atmosphere is exhausted by and compressed in a vacuum pump. Though otherwise preferable, oil-seal vacuum pummps cannot be used for this purpose because their exhaust is contaminated with oil, making water reclamation unfeasible. Instead, contemporary 40×8×8 foot prototype hypobaric intermodal transportation containers are equipped with a water-sealed vacuum pump, which is injected with enough refrigerated seal water to promote and sustain a nearly isothermal compression, and supercharged with a Roots vacuum pump to improve efficiency at low inlet pressures. The refrigeration equipment needed to cool the seal water uses nearly 5 KW of electric power, the supercharged vacuum system about 3 KW more than an oil seal vacuum pump having comparable effective displacement, and the heating element in the humidifier up to 2 additional regulated KW. Not only does the humidification step more than double the size of the refrigeration and motor generating systems which are needed, but in addition it creates a requirement for automatic boiler filling and flushing systems, automatic drains and heating tapes to prevent equipment freeze-up during periods of operation and inoperation at ambient temperatures lower than 0° C., and complex safeguards and controls to integrate the systems. In this manner the humidification step increases the equipment and operational costs, reduces reliability and maintainability, and increases the transportation cost per pound of metabolically active matter.

SUMMARY OF THE INVENTION

Eliminating the humidification step of U.S. Pat. Nos. 3,958,028 and 4,061,483, wherein atmospheric air is preconditioned to an optimal storage pressure and temperature and then saturated by contacting it with a body of heated water, is one object of my invention. My new method keeps the steady-state relative humidity in the storage chamber close to saturation by different means, substituting product water and respiratory heat for the external body of water and the supplementary heat source specified in U.S. Pat. Nos. 3,958,028 and 4,061,483. I evacuate the cargo chamber at a rate correlated to the stored plant matter's type, weight and respiration rate at an optimal pressure and temperature; leak in just enough expanded relatively dry atmospheric air to maintain the optimal pressure; immediately mix each incoming volume of expanded relatively dry atmospheric air with no less than 25 volumes of recirculating rarified chamber air which previously was saturated with moisture evaporated from the stored plant matter responsive to its respiratory heat; and then flow this mixture over the plant matter. Even though my new invention saturates the cargo atmosphere with moisture derived from the plant matter, whereas the method of U.S. Pat. Nos. 3,958,028 and 4,061,483 uses supplementary water for that purpose, nevertheless due to the unique nature of the heat transfer process under hypobaric conditions, my new method and the old method of U.S. Pat. Nos. 3,958,028 and 4,061,483 cause the same amount of product drying and weight loss during equivalent storage periods.

I have discovered that a relatively broad spectrum of correlated hypobaric pressures, low temperatures, evacuation rates, air recirculation rates, and air intake rates, characterized in part by the dependence of each set of correlated conditions upon the weight, respiration rate and type of plant matter, are operational in preserving respiring plant matter without recourse to the step of humidifying the incoming expanded dry atmospheric air by contacting it with a supplementary body of heated water. For each type of respiring plant matter the optimal storage pressure is slightly higher using the method and equipment of my new invention than it is when the older method and equipment of U.S. Pat. Nos. 3,958,028 and 4,061,483 are used; the optimal temperature is the same; the optimal air intake and evacuation rates are considerably lower with the new invention; and the required air recirculation rate is much higher.

BRIEF DESCRIPTION OF THE DRAWING

The drawing is in part a schematic flow diagram and in part a diagrammatic representation of one form of chamber and apparatus embodying and/or suitable for practicing my new invention.

DESCRIPTION AND EXPLANATION OF THE PREFERRED EMBODIMENTS

Convective heat transfer is so restricted in a partial vacuum, and radiative heat transfer from densely stacked cargo loads is so ineffectual, that evaporative cooling using product water as a moisture source is the only heat transfer mode able to remove respiratory heat from plant matter stored at a hypobaric pressure. Therefore, regardless of the relative humidity in a hypobaric storage chamber the rate of evaporative cooling (pounds of water vaporized × heat of vaporization = evaporative cooling) is never less than the rate of respiratory heat evolution, and stored plant matter always evaporates at least that weight of water each day. The factors and conditions which determine the rate of respiration and heat evolution, and therefore the minimum weight loss per day are (a) the type and amount of stored plant matter, and (b) the chamber pressure and temperature. Respiration progressively decreases when the temperature or oxygen partial pressure is lowered, and since the oxygen partial pressure depends in part on the chamber pressure, respiration also decreases at lower chamber pressures. Assuming that the respiratory heat load at an optimal temperature and pressure (Table 1) is the only energy source available to vaporize water, commodity weight loss will vary from 0.012 to 0.132% each day depending upon the type of plant matter. This amount of drying causes no adverse effect during many months of storage. However, if the plant matter receives heat from its environment, this energy will cause additional water to vaporize, and if the amount of acquired environmental heat is large enough the plant matter will dry and spoil prematurely. To receive environmental heat by convection and/or radiation, stored plant matter must have a steady-state temperature which is less than the dry-bulb temperature of the cargo air and/or less than the temperature of the chamber walls respectively. The steady-state temperature of stored plant matter tends to track the wet-bulb temperature at a subatmospheric pressure because the rate of evaporative cooling depends upon the vapor pressure gradient between the product's water and the moisture in the surrounding cargo air. Consequently, if the relative humidity of incoming expanded dry air is not raised by humidification, the temperature of the stored matter begins to decrease. As this happens (a) evaporative cooling slows because the plant matter's water vapor pressure is less at a lower temperature, and (b) convective and radiative heat uptake is promoted because the temperature difference between the plant matter and the cargo air and walls increases. The temperature of the plant matter stabilizes at a value which causes heat uptake due to respiration, convection and radiation to be balanced by evaporative cooling.

The method of U.S. Pat. Nos. 3,958,028 and 4,061,483 prevents the temperature of stored metabolically active matter from decreasing to less than the cargo air or wall temperature by preconditioning the incoming expanded dry atmospheric air to the optimal pressure and temperature for storage, and then saturating the preconditioned air responsive to contact with a body of heated water. I now have discovered that the performance of the hypobaric methods is not compromised and its economic utility is greatly enhanced by humidifying the rarified chamber air with the minimum amount of product water which invariably is evaporated responsive to respiratory heat. I have used euations 1 and 2 to compute the critical evacuation rate ($S_{eff}/M$) and critical inflow of expanded atmospheric air ($C_i/fM$) per pound of plant matter needed to saturate the chamber atmosphere with product water so that all of the plant matter's respiratory heat and no environmental heat is carried away in the saturated airsteam mixture exhausted by the vacuum pump:

$$S_{eff}/M = H_{r1}/(H_{v1}d_1) \qquad \text{Equation 1}$$

$$C_i/M = S_{eff}(P_1 - vp_1)T_a/MT_1 \qquad \text{Equation 2}$$

where $S_{eff}$ is the effective evacuation rate (cfm), M is the weight of plant matter (pounds), $H_{r1}$ is the respiratory heat production (BTU/min/pound of plant matter) at an optimal pressure ($P_1$, atm) and temperature ($T_1$, °R), $H_{v1}$ is the heat of vaporization of water at $T_1$, $vp_1$ is the vapor pressure of water (atm) at $T_1$, $d_1$ is the density of saturated steam (pounds/ft$^3$) at $T_1$, $C_1$ is the rate (cfm) at which dry atmospheric air enters the vacuum tank at atmospheric pressure and temperature, and $T_a$ is the ambient temperature (°R). For different types of plant matter the critical evacuation rate (Table 2) varies from 0.27 to 2.54 × 10$^{-3}$ cfm/pound of plant matter. To the extent that ambient humidity provides water to the incoming air changes, or if the evacuation rate is set lower than the value in Table 2, water will condense harmlessly in the storage chamber and the plant matter's temperature will rise slightly. An exaggeration of this 'supersaturated' condition is provoked whenever the method of U.S. Pat. No. 3,958,028 and equipment of U.S. Pat. No. 4,061,483 are used to preserve metabolically active matter, for then all moisture lost by the commodity as well as any moisture brought in from the environment condenses on the walls and accumulates on the floor of the storage chamber.

The evacuation rate and amount of incoming atmospheric air cannot be arbitrarily decreased without considering other functions which the incoming air fulfills. Air changes are needed to supply respiratory oxygen and flush away metabolic ethylene, carbon dioxide and other volatile byproducts. The method of U.S. Pat. Nos. 3,958,028 and 4,061,483 depends on an excessively rapid rate of air intake to prevent the cargo space oxygen partial pressure from decreasing significantly due to respiratory oxygen draw-down. If too little atmospheric oxygen is supplied, respiratory oxygen consumption will draw down the steady-state oxygen partial pressure enough to damage the plant matter due to oxygen deprivation and fermentative metabolism. The rate at which oxygen is supplied to the vacuum chamber [($O_2)_{in}$, moles/pound/min] is:

$$(O_2)_{in} = 0.88 S_{eff}(P_1 - vp_1)/RT_1M \qquad \text{Equation 3}$$

where R is the gas constant (82.06 atm cm$^3$/moles °C.). The rate at which oxygen is consumed in the vacuum tank [($O_2)_{cons}$, moles/pound/min)] is:

$$(O_2)_{cons} = 2.25 \times 10^{-3} H_{r1} \qquad \text{Equation 4}$$

The rate at which oxygen is evacuated from the cargo area [$(O_2)_{out}$, moles/pound/min] is:

$$(O_2)_{out} = 345.1 S_{eff} pO_2 / M T_1 \quad \text{Equation 5}$$

where $pO_2$ is the steady-state oxygen partial pressue in the vacuum tank. At steady-state:

$$(O_2)_{in} = (O_2)_{cons} + (O_2)_{out} \quad \text{Equation 6}$$

Substituting values from equations 3–5 for $(O_2)_{in}$, $(O_2)_{cons}$, and $(O_2)_{out}$ into equation 6:

$$pO_2 = 0.209 (P_1 - vp_1) - 6.52 \times 10^{-6} T_1 H_{v1} d_1 \quad \text{Equation 7}$$

At the optimal storage pressure and temperature indicated in Table 1, if the critical evacuation rate is the Table 2 value, depending upon the type of plant matter the $pO_2$ will be drawn down 3 to 39% (Table 2). A 39% reduction in oxygen partial pressure, which is characteristic of most types of plant matter stored at their optimal temperature and pressure, would cause serious adverse effects. Therefore the storage pressure needs to be elevated to compensate for the anticipated oxygen draw-down, and also for other reasons described below.

The respiratory heat loads in Table 1 are USDA compiled average values at atmospheric pressue, corrected according to a nomogram (Burg and Kosson, 1983) which takes into account the respiratory inhibition caused by various hypobaric pressures. According to USDA data (USDA, 1968) the average respiratory values in Table 1 are not representative of all samples of each type of plant matter because different varieties of each type, and even the same variety at different seasons, grown in different locales, with different nutrition and rainfall, or stored at different stages of development, maturity, ripeness or senescence, may exceed the average value by as much as 1.5-fold, or respire half as rapidly as this value would suggest. One way of taking account of this variability is to measure the respiratory heat output of each lot of stored plant matter under hypobaric conditions before computing and adjusting the critical evacuation rate. This measurement is conveniently accomplished by determining the concentration of carbon dioxide in the vacuum pump exhaust after at least ten rarified air changes have passed through the storage chamber.

$$\text{BTU/TON/DAY} = 5.38 \times 10^7 P_1 S_{eff}(CO_2) / R T_1 M \quad \text{Equation 8}$$

where $(CO_2)$ is the percent carbon dioxide in the vacuum pump exhaust. The data in Table 2 show that the exhaust carbon dioxide typically is high enough, ranging from 0.59 to 4.56% for different types of plant matter, to be quickly and easily measured by inexpensive, portable, relatively insensitive means such as a Kitagawa gas analyzer. Sometimes it is not practical or convenient to measure the exhaust $CO_2$, and then it is prudent to anticipate and compensate for a variation of as much as ±50% in the average respiratory heat evolution (Table 1) by elevating the chamber pressure above the optimal shown in Table 1, and by reducing the evacuation rate below the 'average' value presented in Table 2. The 'safe' storage pressure ($P_2$, atm) and correlated 'safe' evacuation rate $(S_{eff}/M)^*$ required to accomodate differing degrees of variability in respiratory heat evolution while still providing the steady-state oxygen partial pressure characteristic of the optimal storage pressure ($P_1$, atm) in Table 1 is:

$$P_2 = P_1 + 3.12 \times 10^{-5} T_1 H_{v1} d_1 (1 + 10^{-2} a) / (1 - 10^{-2} a) \quad \text{Equation 9}$$

$$(S_{eff}/M)^* = (S_{eff}/M)(1 - 10^{-2} a) \quad \text{Equation 10}$$

Since $H_v$, d, and T in equation 9 are temperature dependent constants, the amount that the storage pressure needs to be increased to accomodate variations in respiration rate depends only on storage temperature and the value of a, where a is the percent variability of the average respiratory rate data in Table 1. For each type of plant matter, when the critical evacuation rate ($S_{eff}/M$) is set proportionate to an actual measurement of respiratory heat evolution, the safe pressure is that shown for a=0 (Table 3). To accomodate a ±50% variation in the average respiratory heat load (Table 1) the critical flow $(S_{eff}/M)^*$ must be set at one-half the value presented in table 2, and the pressure at the value shown for a=50 (Table 3). Regardless of whether the critical flow is set proportionate to the actual respiration rate, or 'safely' at half that value the weight loss will be the same, but when the critical flow is set at half-value the steady-state temperature of the plant matter will slightly increase and half of the moisture vaporized responsive to respiratory heat will condense harmlessly within the storage chamber and not be carried away by the critical flow. If instead the critical flow were to be set too high this would have serious detrimental consequences, for now the steady-state temperature of the plant matter will be less than the chamber air and wall temperature. The incremental loss in weight which this condition causes will be proportionate to the extent that the critical flow has been set too high. The critical flow also depends on the mass of plant matter which is stored, so whenever a portion of the stored plant matter is unloaded, the evacuation rate should be reduced proportionate to the weight removed.

(a) The method of U.S. Pat. Nos. 3,333,967 and 4,061,483, or (b) my new method practiced with optimal conditions of pressure and evacuation rate when a=0, or (c) when a=50, provide the same benefit in preserving plant matter. The expected weight loss is the same in (a), (b) and (c) and the incremental increase in storage pressure when a ranges from 0 to 50 is so small (Table 3) that even under carefully controlled laboratory test conditions this change in pressure causes no perceptible decrease in storage-life when (c) is compared to (a) and (b).

In the drawing, respiring plant matter 15 is preserved in insulated vacuum tank 16 and kept at a controlled low temperature by a refrigeration system depicted as refrigeration ducts 17, which may also constitute the structural reinforcing rings of vacuum tank 16. The regulating valves are positioned so that the equipment will pump down the vacuum tank as rapidly as possible and then control the pressure and evacuation rate at optimal values for the particular type of plant matter. Initially, tank isolation valves 1 and 3 are closed, blowdown valve 5 is closed, bypass valve 2 is opened, and vacuum pump 11 is turned on. A decrease in the pressure within bypass conduit 19 is transmitted to side 23 of the diaphragm of normally open regulating valve 7. Opposite side 24 of the same diaphragm is vented to atmosphere through conduit 20 and supply jets 14 of pneumatic venturi air horn 13. The pressure difference between 23 and 24 closes regulating valve 7. The vacuum in bypass conduit 19 serves as a reference pressure on side 25 of the diaphragm of normally closed regulator valve 6, and also as a vacuum supply for absolute pressure regulating valve 9, which contains a sealed absolute vacuum as a reference pressure. Regulator 9 is manually adjusted to maintain a preselected absolute reference pressure in side 26 of the diaphragm of normally closed regulating valve 6 by evacuating side 26 and leaking in a controlled amount of atmospheric air drawn from air filter 8 through conduit 27. Responsive to the difference between absolute reference pressure 26 and the pressure in side 25, normally closed regulator 6 opens when the pressure in conduit 19 decreases to the preset optimum for storage. Regulator 6 maintains the optimal storage pressure in conduit 19 by continuously leaking in the proper amount of filtered atmospheric air. The pressure in bypass conduit 19 is measured by means of absolute vacuum gauge 10 when 3-way selector valve 12 is turned to connect vacuum gauge 10 to bypass conduit 19. The evacuation rate is adjusted by progressively throttling vacuum pump 11 by means of throttling valve 4 until the pressure at the inlet to vacuum pump 11, measured by turning 3-way selector valve 12 to connect gauge 10 to conduit 21, is in the correct ratio to the pressure in bypass conduit 19 in accord with the expression:

$$S_{eff} = SP_2/P_1 \qquad \text{Equation 11}$$

where S is the volumetric capacity of vacuum pump 11, $P_1$ is the optimal pressure established and controlled in bypass conduit 19, and $P_2$ is the pressure at the inlet to vacuum pump 11. After the valves have been adjusted in this manner, vacuum tank 16 is pumped down by opening vacuum tank isolation valves 1 and 3 and closing bypass valve 2, causing vacuum tank 16 to substitute for bypass conduit 19 in the flow system. During tank pumpdown, normally open high capacity regulating valve 7 remains open because side 24 of its diaphragm is connected via conduit 20 and supply jet openings 14 of pneumatic venturi air horn or air mover 13 to the interior of vacuum tank 16, and from there via conduit 28 to opposite side 23 of the diaphragm of regulating valve 7. Parallel flow to the inlet of vacuum pump 11 now occurs through regulating valve 7 and throttling valve 4. Utilization of the full capacity of vacuum pump 11 during pumpdown is guaranteed because regulating valve 7 has been selected to have a larger volumetric flfow capacity at atmospheric pressure than the volumetric displacement of vacuum pump 11. When pumpdown is completed, normally closed regulating valve 6 opens, continuously pressurizing the supply line and jets 14 of pneumatic venturi air horn 13. This pressure is transmitted via conduit 20 to side 24 of the diaphragm of normally open regulating valve 7. The pressure differential across the diaphragm of regulating valve 7 which develops pursuant to pressurizing side 24, closes regulating valve 7, thereby throttling vacuum pump 11 to the parallel flow capacity preset by throttling valve 4. Pressurized air entering pneumatic venturi air mover 13 through supply jets 14 induces a flow of no less than 25 volumes of rarified chamber air derived from duct 18 pr volume of expanded supply air consumed by air mover 13, provided that the static head across air mover 13 is kept small be appropriately sizing duct 18 and the elevation of ventilated floor 22. Discharge from air horn 13 blows the full length of the storage chamber over product 15, returning to duct 18 both through stored plant matter 15 and under ventilated floor 22. Vacuum tank 16 is readied for loading or unloading cargo by turning off vacuum pump 11 and opening blowdown valve 5 to repressurize vacuum tank 16 with atmospheric air preconditioned by passage through air filter 8.

Other ways and means of recirculating rarified chamber air, such as a motor driven fan or Roots vacuum blower, may be substituted for pneumatically powered venturi air mover 13, but each has significant disadvantages. Unless fan cooled electric motors are jacketed and cooled by supplementary refrigeration flow, they tend to overheat in a vacuum because convective cooling by forced air is ineffectual at subatmospheric pressures. Alternatively, the motor can be hydraulically powered, or else an electric motor may be mounted outside the vacuum tank and used to drive either an interior fan by means of a mechanical vacuum feedthrough, or a Roots vacuum blower which withdraws air from and returns air to the vacuum tank through appropriate external conduits. Electric motors and Roots vacuum blowers present the additional disadvantage that they continuously introduce a considerable amount of heat into the vacuum tank, thereby substantially raising the temperature of the recirculating low heat capacity rarified air.

The air distribution system presently used in prototype hypobaric shipping containers embodying the method and equipment of U.S. Pat. Nos. 3,958,028 and 4,061,483 introduces expanded, humidified atmospheric air at one end or side of the vacuum tank, and draws vacuum from the opposite end or side. Recirculation is not required to prevent a progressive decline in oxygen partial pressure due to respiratory oxygen draw-down because an excessive intake of atmospheric air provides a surfeit of oxygen. The humidification system saturates the incoming rarified air before it enters at one end or side of the cargo chamber, so the relative humidity cannot increase due to evaporation of product water as the rarified air passes through the cargo load. If this air distribution system was used to practice my new invention, the oxygen partial pressure would decrease and the humidity increase as the relatively smaller flow of dry, non-humidified incoming atmospheric air passes through the cargo. Plant matter stored at the end or side where the dry air enters would lose an excessive amount of water, and plant matter stored at the other end or side would be exposed to too low an oxygen partial pressure.

Before incoming dry expanded atmospheric air is released into the cargo space and brought into contact with the stored plant matter, each incoming volume is with at least about 25 volumes of rarified cargo air previously saturated with product moisture evaporated responsive to respiratory heat. At certain times the incoming atmospheric air may be as much as 40° C. hotter than the cargo air and chamber walls, but upon mixing in a 25:1 ratio with chamber air, the discharge temperature can be no more than 1.6° C. hotter than the chamber walls. Since rarified air has a very low heat capacity, this discharge mixture readily cools to the wall temperature before contacting the plant matter. If the incoming atmospheric air was completely dry, the mixture discharging from the air horn would have a relative humidity of 96% at the cargo air temperature, but since the atmospheric air always contains some moisture, the mixture discharging from the air horn generally is saturated or supersaturated. The vapor pressure of water in respiring plant matter is only about 98% that of pure water at the same temperature due to dissolved solids and low turgor pressure in harvested plant matter. Therefore, air discharging from the venturi air mover needs to have a relative humidity of only about 98% at the product temperature to assure that product drying will not exceed the theoretical lower limit imposed by the requirement to dispel respiratory heat by evaporative cooling under hypobaric conditions. the pneumatic air mover must be sized so that when its jet nozzles are pressurized to 1 atmosphere, it consumes slightly more atmospheric air then the amount brought in at the highest optimal pressure and critical flow for any type of plant matter. The ratio of induced: supply air flow typically is about 25:1 in a well designed pneumatically powered ventruri air horn.

The evacuation rate must always be set low enough to satisfy the condition that the rate at which moisture is exhausted from the chamber is less than the rate at which it vaporizes from the plant matter responsive to respiratory heat, but within the limits imposed by this constraint, the evacuation rate should always be set as high as possible to provide the maximum feasible ventilation rate in order to flush away carbon dioxide, ethylene and other volatile metabolic byproducts, and also to provide the maximum amount of incoming oxygen.

evaporative cooling, 1.3% of the initial fresh weight of the limes needs to be vaporized in 3 weeks. The evacuation rate required to exhaust exactly this quantity of moisture as saturated steam is 215 cm$^3$/min at 10° C. In the present example, the evacuation rate was adjusted to 61 cm$^3$/min, so that a substantial amount of water condensed in the storage chamber during 3 weeks. The limes remained green and fresh, and they lost 1.4% of their initial fresh weight during 21 days of hypobaric storage. Upon subsequent transfer to a conventional forced air cold storage room, they began to yellow in 8 to 10 additional days, whereas fresh green limes initially stored in a conventional forced air cold room lost 6.7% of their fresh weight during 21 days storage, and began to yellow within the first 10 to 12 days. This example demonstrates that when limes are stored without supplementary humidification under optimal conditions of temperature, hypobaric pressure and recirculation, at an evacuation rate which is 28% of that needed to remove all respiratory heat as saturated steam, they lose the predicted amount of weight correlated to their respiration rate, and are preserved as well as when they are stored with supplementary humidification by the method of U.S. Pat. Nos. 3,958,028 and 4,061,483.

TABLE 1

Respiratory Heat, Weight Loss and Inhibition of Respiration at Optimal Storage Pressure and Temperature (Using the Method of U.S. Pat. No. 3,958,028 and 4,061,483)

| Type of Plant Matter | Temperature (°C.) | Pressure (mm HgA) | % resp. inhib. due to low pO$_2$ | Resp. heat (BTU/ton/day) | Weight loss (%/day) |
|---|---|---|---|---|---|
| Apple | 0 | 50 | 64 | 252 | .012 |
| Asparagus | 0 | 10 | 77 | 2200 | .103 |
| Avocado | 10 | 20 | 80 | 2800 | .132 |
| Banana | 13.8 | 40 | 66 | 1656 | .078 |
| Carnation (bloom) | 2.2 | 15 | 85 | 1950 | .090 |
| Chrysanthemum (bloom) | 0 | 10 | 80 | 462 | .022 |
| Corn | 0 | 50 | 70 | 2685 | .125 |
| Cucumber | 12.8 | 80 | 60 | 1050 | .049 |
| Lettuce | 0 | 10 | 80 | 550 | .026 |
| Lime | 10 | 150 | 40 | 850 | .040 |
| Mango | 12.8 | 80 | 60 | 1500 | .071 |
| Melon (honeydew) | 10 | 20 | 80 | 1400 | .065 |
| Mushroom | 0 | 10 | 80 | 1760 | .083 |
| Papaya | 10 | 20 | 80 | 625 | .029 |
| Pepper (sweet) | 10 | 80 | 60 | 1848 | .087 |
| Pineapple | 10 | 20 | 80 | 385 | .018 |
| Rose (bloom) | 0 | 10 | 80 | 2376 | .110 |
| Strawberry | 0 | 10 | 80 | 726 | .034 |

EXAMPLE

Freshly harvested Persian limes (var. Tahiti) were cooled to 10° C., weighed, and then 10 pound sample lots were stored at 10° C. either in a conventional forced air cold storage room or in a 4.5 gallon laboratory vacuum jar at 155 mm HgA. Incoming atmospheric air flow was measured with a rotameter, controlled with a needle valve, and admitted at the discharge side of an internal fan rotating at a speed sufficient to move more than 25 chamber volumes of rarified air per volume of incoming expanded atmospheric air. The fan was powered by a mechanical vacuum feedthrough and an external electric motor. Respiratory heat evolution at 155 mm HgA, 10° C., was determined to be 1311 BTU/ton/day, based on analyses of the carbon dioxide content of the vacuum pump exhaust made during a 21 day storage period. This rate of heat production is approximately 50% greater than the average value in Table 1, so a= ±50% (Table 3). To dispel this amount of heat by

TABLE 2

Weight Loss, Exhaust Carbon Dioxide, and Decrease in Chamber pO$_2$ at the Critical Evacuation Rate for Each Type of Plant Matter

| Type of Plant Matter | Evacuation rate (cfm/pound × 10$^3$) | % pO$_2$ decrease due to resp. | Exhaust CO$_2$ (%) |
|---|---|---|---|
| Apple | 0.27 | 6 | 0.88 |
| Asparagus | 2.35 | 39 | 4.40 |
| Avocado | 1.56 | 38 | 4.38 |
| Banana | 0.78 | 18 | 2.62 |
| Carnation (bloom) | 1.83 | 23 | 3.58 |
| Chrysanthemum (bloom) | 0.49 | 39 | 4.43 |
| Corn | 2.87 | 6 | 0.88 |
| Cucumber | 0.71 | 5 | 0.91 |
| Lettuce | 0.59 | 39 | 4.37 |
| Lime | 0.47 | 3 | 0.59 |
| Mango | 0.70 | 5 | 1.27 |
| Melon (honeydew) | 0.78 | 38 | 4.38 |
| Mushroom | 1.88 | 39 | 4.56 |
| Papaya | 0.35 | 38 | 4.35 |
| Pepper (sweet) | 1.03 | 6 | 1.09 |
| Pineapple | 0.21 | 38 | 4.47 |
| Rose (bloom) | 2.54 | 39 | 4.56 |

TABLE 2-continued

Weight Loss, Exhaust Carbon Dioxide, and Decrease in Chamber $pO_2$ at the Critical Evacuation Rate for Each Type of Plant Matter

| Type of Plant Matter | Evacuation rate (cfm/pound × 10³) | % $pO_2$ decrease due to resp. | Exhaust $CO_2$ (%) |
|---|---|---|---|
| Strawberry | 0.78 | 39 | 4.53 |

All computations presented in this table are based on the optimal pressure, optimal temperature and average respiratory heat load data in Table 1.

TABLE 3

Elevation in Storage Pressure Required to Accomodate Respiratory Oxygen Drawdown and Variability in Respiratory Heat Evolution[FN]

| | 'Safe' pressure (mm HgA) | | |
|---|---|---|---|
| Type of Plant Matter | a = 0 | a = 50 | Variability |
| Apple | 52 | 54 | |
| Asparagus | 12 | 16 | |
| Avocado | 24 | 28 | |
| Banana | 44 | 48 | |
| Carnation (bloom) | 17 | 20 | |
| Chrysanthemum (bloom) | 12 | 14 | |
| Corn | 52 | 54 | |
| Cucumber | 85 | 90 | |
| Lettuce | 12 | 14 | |
| Lime | 154 | 158 | |
| Mango | 85 | 90 | |
| Melon (honeydew) | 24 | 28 | |
| Mushroom | 12 | 14 | |
| Papaya | 24 | 28 | |
| Pepper (sweet) | 84 | 88 | |
| Pineapple | 24 | 28 | |
| Rose (bloom) | 12 | 14 | |
| Strawberry | 12 | 14 | |

[FN]where a = % variability (±). The evacuation rate when a = 50 is half the rate when a = 0.

I claim:

1. A method of preserving respiring plant matter comprising:

placing said matter in a vacuum chamber having walls enclosing a storage space, whereby said plant matter respires to produce respiration products including moisture which helps develop an essentially saturated air environment at subatmospheric pressure in said storage space, controlling the temperature of said chamber so that said matter is between minus 1 degree Celsius and plus 16 degrees Celsius, simultaneously evacuating said chamber at a regulated rate to control the pressure within said storage space to a subatmospheric pressure and to remove a portion of said air and said respiration products including said moisture from said storage space, simultaneously recirculating said air and said respiration products between said storage space and an air mixing means within said vacuum chamber at a regulated rate, simultaneously adding expanded atmospheric air to said air mixing means at a regulated air intake rate to mix said expanded atmospheric air with said recirculating air and said recirculating respiration products at a regulated mixing rate to form a resulting mixture, simultaneously releasing said resulting mixture from said air mixing means to said storage space at a regulated rate to control the pressure in said vacuum chamber to a pressure between 5 and 400 mm HgA, simultaneously circulating said resulting mixture within said storage space at a controlled recirculation rate, and correlating said controlled temperature with said controlled pressure, said regulated evacuation rate, said regulated air intake rate, said regulated mixing rate and said controlled recirculation rate depending on the weight, respiration rate and type of said plant matter in said vacuum chamber, to preserve said plant matter for a prolonged time.

2. The method of claim 1 wherein each volume of said expanded incoming air is mixed with at least 25 volumes of said recirculating chamber air and said respiration products.

3. The method of claim 1 wherein said controlled evacuation rate exhausts nearly saturated steam from said vacuum chamber less rapidly than moisture vaporizes from said plant matter responsive to the rate of respiratory heat evalution of said matter at the controlled temperature and pressure.

4. The method of claim 1 wherein said controlled pressure is slightly elevated above the optimal storage pressure at an excessive air intake rate to compensate for respiratory oxygen draw-down and provide an optimal steady-state oxygen partial pressure when said respiring plant matter is preserved at a much slower air intake rate.

5. The method of claim 1, wherein said controlled recirculation rate is sufficient to maintain a uniform humidity and oxygen partial pressure through said chamber.

6. The method of claim 1 wherein said correlated conditions are such as to prevent the temperature of any portion of the stored plant matter from decreasing to below the temperature of the chamber air and walls due to evaporative cooling.

7. The method of claim 1, further including adding said incoming atmospheric air to said chamber through supply nozzles of a pneumatically powered venturi air mover to induce recirculation and redistribution of the rarified air in said chamber, and to automatically mix the proper amount of rarified nearly saturated chamber air with incoming expanded atmospheric air before said incoming expanded atmospheric air contacts said plant matter.

8. The method of claim 1, further including measuring the carbon dioxide or oxygen concentration in the material evacuated in order to compute the rate of oxygen consumption and heat evolution of said plant matter, so that the evacuation rate can be accurately adjusted to exhaust nearly saturated stream from said chamber less rapidly than moisture is vaporized from said plant matter responsive to the respirating heat of said plant matter.

9. The method of claim 1, further including decreasing the evacuation rate and increasing the storage pressure by values sufficient to accommodate up to a ±50% variation in published values for the average respiratory heat evolution for each type of respiring plant matter, in order to prevent injury to said plant matter due to oxygen deprivation and/or excessive water loss.

10. The method of claim 1 wherein the stored plant matter comprises fruits, vegetative materials, fungal products and floral crops such as asparagus, carnation blooms, chrysanthemum blooms, lettuce, mushrooms, rose blooms and strawberries, further including maintaining the temperature between 0° and 2.2° C., keeping the pressure between 12 and 19 mm HgA, the evacuation rate between 0.25 to $2.5 \times 10^{-3}$ cfm/pound, and the air intake rate between 0.25 and $2.5 \times 10^{-5}$ scfm/pound.

11. The method of claim 1 wherein the stored plant matter comprises fruits and vegetative materials such as apples and corn, further including maintaining the temperature at 0° C., keeping the pressure between 52 to 54 mm HgA, the evacuation rate between 0.13 and $2.87 \times 10^{-3}$ cfm/pound, and the air intake rate between 0.08 and $1.8 \times 10^{-4}$ scfm/pound.

12. The method of claim 1 wherein the stored plant matter comprises fruits such a melons, papaya, pineapple and avocado, further including maintaining the temperature between 10 to 13.8° C., the pressure between 24 to 28 mm HgA, keeping the evacuation rate between 0.1 and $1.56 \times 10^{-3}$ cfm/pound, and the air intake rate between 0.2 and $3.9 \times 10^{-5}$ scfm/pound.

13. The method of claim 1 wherein the stored plant matter comprises fruits and vegetative materials such as cucumber, mangoes, peppers, and bananas, further including maintaining the temperature between 10° and 13.8° C., keeping the pressure between 44 and 90 mm HgA, controlling the evacuation rate between 0.35 and $1 \times 10^{-3}$ cfm/pound, and the air intake rate between 0.3 $1.1 \times 10^{-4}$ scfm/pound.

14. The method of claim 1 wherein the stored plant matter comprises fruits such as limes, further including maintaining the temperature at 10° C., keeping the pressure between 154 and 158 mm HgA, the evacuation rate between 0.2 and $0.5 \times 10^{-3}$ cfm/pound, and the air intake rate between 3.7 and $9.4 \times 10^{-5}$ scfm/pound.

15. Storage apparatus for preserving fresh respiring plant matter comprising:

a vacuum chamber constructed and arranged with a storage space to receive said matter therein for preservation, means to maintain the temperature of said chamber between minus 1 degree Celsius and plus 16 degrees Celsius, means to evacuate said chamber, air mixing means within said chamber, means communicating with said air mixing means to add expanded atmospheric air to said air mixing means, means within said chamber to circulate air and respiration products including moisture from said respiring plant matter stored within said storage space and said air mixing means to mix said circulated air and said respiration products with said expanded atmospheric air to form a resulting mixture and to release said resulting mixture to said storage space, and pressure control means constructed and arranged in cooperative relation to said vacuum chamber to control the pressure in said vacuum chamber to a pressure between 5 and 400 mm HgA.

16. The storage apparatus of claim 15 in which said means for mixing said incoming atmospheric air with said recirculating humid rarified chamber air, and said means for distributing said mixture throughout said chamber is a pneumatic venturi air mover having supply jets and powered by said added atmospheric air when it enters said chamber through the supply jets of said air mover.

17. The storage apparatus of claim 15 wherein said means to maintain the temperature of said chamber between $-1$ and $+16$ degrees Celsius comprises refrigeration means constructed and arranged in heat exchange relation to wall means defining said chamber.

18. The storage apparatus of claim 15 in which said mixing means is constructed and arranged to combine at least 25 volumes of previously saturated rarified chamber atmosphere with each volume of added expanded atmospheric air.

19. The method of claim 1, including performing said method in such a manner that the air added to said vacuum chamber is dry air.

20. The method of claim 1, further including regulating the evacuation rate to a rate such that moisture is exhausted from the chamber at a lesser rate than that at which respiratory heat of said plant matter vaporizes moisture at said controlled temperature, but as high as possible to flush away metabolic by-products within the limit of said lesser rate.

* * * * *